United States Patent [19]

Kawasaki

[11] 4,089,012
[45] May 9, 1978

[54] DIGITAL EXPOSURE TIME INDICATING CIRCUIT FOR CAMERA

[75] Inventor: Masahiro Kawasaki, Tokyo, Japan

[73] Assignee: Asahi Kogaku Kogyo Kabushiki Kaisha, Tokyo, Japan

[21] Appl. No.: 738,994

[22] Filed: Nov. 4, 1976

[30] Foreign Application Priority Data

Nov. 6, 1975 Japan ............................. 50-133375

[51] Int. Cl.² ................................................. G03B 7/08
[52] U.S. Cl. ................................ 354/23 D; 354/53; 354/60 L
[58] Field of Search ..................... 354/23 D, 53, 60 L

[56] References Cited
U.S. PATENT DOCUMENTS

| | | | |
|---|---|---|---|
| 3,972,626 | 8/1976 | Laskowsi | 354/23 D |
| 3,995,284 | 11/1976 | Kitaura et al. | 354/23 D |

Primary Examiner—Russell E. Adams
Attorney, Agent, or Firm—Sughrue, Rothwell, Mion, Zinn and Macpeak

[57] ABSTRACT

A digital exposure time indicating system for a camera includes a light meter whose analog output is proportional to exposure time as a function of preset film sensitivity and aperture opening values, and the measured brightness level. The meter output is fed to a comparator, together with an analog signal from a D/A converter coupled to a counter which accumulates the pulses generated by an oscillator. When the converter output reaches the meter output the comparator signal, acting through a logic circuit, causes the counter signals to be set into a latch, whose outputs are fed through a B/D converter to an LED display.

The latching is performed a half cycle after a comparison, whereby transients are allowed to settle out. Provision is also made for over scale and under scale indications when the meter output is outside of the normal comparison range, and a gate circuit causes the LEDs to flicker when the battery is low.

6 Claims, 4 Drawing Figures

DIGITAL EXPOSURE TIME INDICATING CIRCUIT FOR CAMERA

BACKGROUND OF THE INVENTION

This invention relates to a digital exposure time indicating device for a camera.

An ammeter has hitherto been used for indicating shutter speed or the like in a camera. Such an instrument is generally unreliable and difficult to read and use accurately, however, owing to, inter alia, pointer needle fluctuations due to vibration. For this reason, there is an increasing trend to provide a digital type, light-emitting diode and lamp for indicating shutter speed or the like. This normally requires an extremely complicated electrical circuit for accurately converting a measured brightness level, which is an analog value, into a digital exposure time value.

SUMMARY OF THE INVENTION

It is, accordingly, an object of the present invention to provide a digital exposure time indicating device for use in a camera, wherein an analog signal computed from the measured brightness level of a scene or object to be photographed is converted into a digital exposure time value by simple and reliable electronic circuits.

Briefly, and in accordance with the present invention, a digital exposure time indicating system for a camera includes a light meter whose analog output is proportional to exposure time as a function of preset film sensitivity and aperture opening values, and the measured brightness level. The meter output is fed to a comparator together with an analog signal from a D/A converter coupled to a counter which accumulates the pulses generated by an oscillator. When the converter output reaches the meter output the comparator signal, acting through a logic circuit, causes the counter signals to be set into a latch, whose outputs are fed through a B/D converter to an LED display.

The latching is performed a half cycle after a comparison, whereby transients are allowed to settle out. Provision is also made for over scale and under scale indications when the meter output is outside of the normal comparison range, and a gate circuit causes the LEDs to flicker when the battery is low.

DETAILED DESCRIPTION OF THE PREFERRED EMBODIMENT

Figure 1:
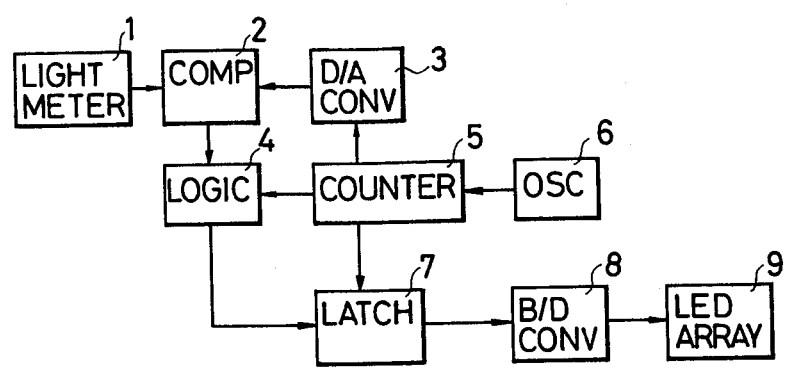
FIG. 1 shows a block diagram of a digital indicating system embodying the present invention.

FIG. 1 shows a light measuring and computing circuit 1 for measuring object brightness and computing analog exposure time as a function of preset aperture and film sensitivity values. An oscillator 6 is connected to a counter 5 for counting the number of pulses generated by the oscillator. Connected to the counter 5 are a digital-to-analog (D/A) converter 3 for converting the digital counter value into an analog value, and a latch circuit 7 controlled by a logic circuit 4. The latter receives the output from a comparator 2 and the outputs from the counter 5, said comparator having as inputs the analog value produced by the light measuring and computing circuit 1 and the analog value generated by the D/A converter 3. Connected to the latch circuit 7 is a decoder circuit 8 for driving an indicating array of LED's 9.

In operation, the output of the counter 5, which counts the number of pulses generated in the oscillator 6, is converted into an analog value by the D/A converter 3, and said analog value is compared with the analog output from the light measuring and computing circuit 1 by the comparator 2. When the analog value from the D/A converter reaches the analog value produced by the light measuring and computing circuit 1, the contents of the counter 5 are stored, in response to a signal from the logic circuit 4, in the latch circuit 7. The contents of the latch circuit 7 are fed through the binary-to-decimal decoder circuit 8 whose outputs actuate the LED indicating array 9, whereby a digital indication of the analog value from the light measuring and computing circuit 1 is displayed.

Figure 2:
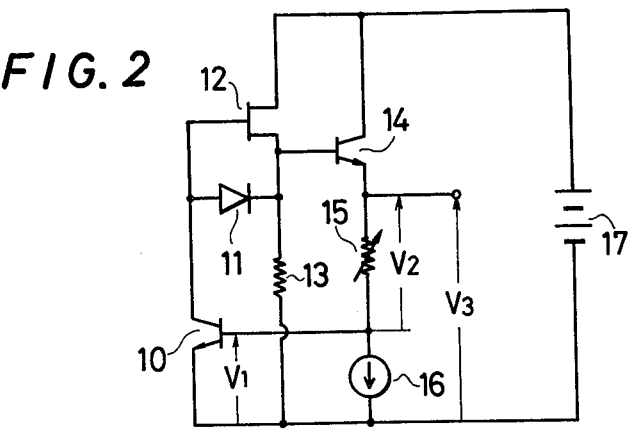
FIG. 2 shows a schematic circuit diagram of the light measuring and computing circuit 1 shown in FIG. 1.

Referring now to FIG. 2, which shows a schematic circuit diagram of an embodiment of the light measuring and computing circuit 1 in FIG. 1, reference numeral 10 designates a logarithmically compressing transistor, to the collector of which is connected the gate of a FET 12, which constitutes a self-biasing circuit in combination with a photo-diode 11 and a resistor 13. Connected to the source of FET 12 is a transistor 14 whose emitter is driven by a constant current source 16. Outputs are fed back from the emmitter of the transistor 14 through a variable resistor 15 to the base of logarithmically compressing transistor 10, the value of said variable resistor being set in accordance with a desired aperture value (f-opening) and a given film sensitivity (ASA, etc.) value. The circuit is driven by a potential source 17.

In operation, outputs are fed back from the collector of transistor 10, which is constant-current-driven by photocurrent from the light receiving diode 11, through the FET 12 and transistor 14, to the base of the transistor 10. As a result, the base-emitter voltage $V_1$ of the logarithmically compressing transistor 10 is proportional to the apex (Additive Photographic EXposure) value of the object brightness B. If the value of the variable resistor 15 is proportional to the difference between the apex value $S_v$ of the film sensitivity S and the apex value $A_v$ of the desired aperture value A (viz., $S_v - A_v$), then the voltage $V_2$ across the variable resistor 15 will be proportional to $S_v - A_v$, and the emitter potential $V_3$ of transistor 14 will be proportional to the apex value $B_v + S_v - A_v$, namely, to the apex value $T_v$ of the exposure time T. The apex system is well known in the photographic arts, and will not be developed in detail herein.

Figure 3:
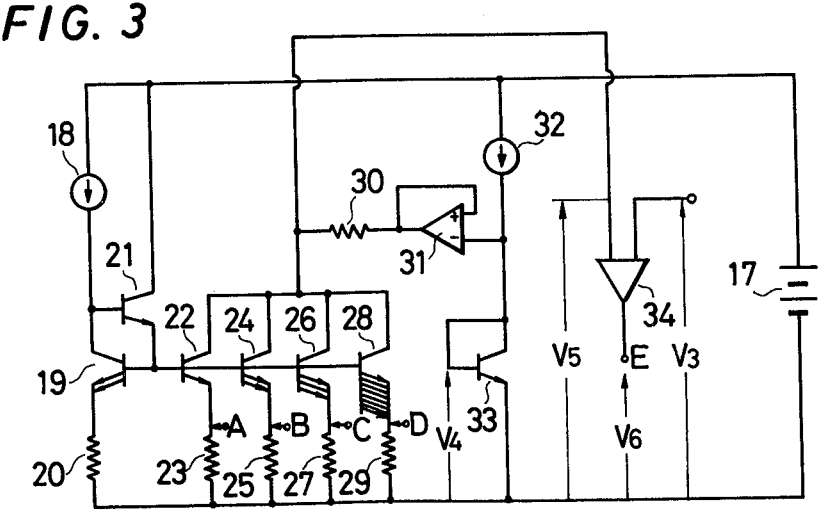
FIG. 3 shows a schematic circuit diagram of the D/A converter 3 and comparator 2 shown in FIG. 1.

FIG. 3 shows a schematic circuit diagram of an embodiment of the D/A convertor 3 and the comparator 2. Reference numeral 18 designates a constant current source, which is coupled to the collector of a transistor 19. An output is fed back from the collector of transistor 19 to its base through a transistor 21. Transistors 22, 24, 26 and 28 have emitter area ratios of 1:2:4:8, respectively, and these emitters are connected to resistors 23, 25, 27 and 29, respectively. A constant current source 32 is connected to a transistor 33, which is diode-coupled in the sense of having its collector directly tied to its base. The collector of transistor 33 is also connected to an operational amplifier 31, which constitutes a voltage-follower circuit, and the output terminal of the amplifier is connected to a comparator 34 through a resistor 30.

Referring now to the operation of the circuit of FIG. 3, assuming that $i_1$ is proportional to the current in the constant current source 18 and resistances 20, 23, 25, 27 and 29 have a ratio of 4:8:4:2:1, respectively, then the collector currents of transistors 22, 24, 26 and 28 will be $i_1/2$, $i_1$, $2i_1$ and $4i_1$. If $R_1$ is the value of resistance 30, and a voltage drop of $i_1R_1/2$ across the resistor 30 due to the collector current of transistor 22 is equal to the per step voltage of the apex value $T_v$ of the voltage $V_3$, which is proportional to the apex value $T_v$ of the exposure time T as measured and computed by the circuit of FIG. 2, and if the base-emitter voltage $V_4$ of transistor 33 is set at a value $(T_{v11})$ of the emitter voltage $V_3$ of transistor 14 in the circuit of FIG. 2 corresponding to the shortest exposure time, then the relationship between the voltage levels at the emitter terminals A, B, C and D of transistors 22, 24, 26 and 28, respectively, which are coupled to the outputs of the counter 5, and the common collector terminal voltage $V_5$ of these transistors, is as given below in Table 1, wherein H represents a voltage in excess of 1 volt.

Table 1

| D | C | B | A | $V_5$ | D | C | B | A | $V_5$ |
|---|---|---|---|---|---|---|---|---|---|
|   |   |   |   | $T_v-4$ | H |   |   |   | $T_v,4$ |
|   |   |   | H | $T_v-3$ | H |   |   | H | $T_v,5$ |
|   |   | H |   | $T_v-2$ | H |   | H |   | $T_v,6$ |
|   |   | H | H | $T_v-1$ | H |   | H | H | $T_v,7$ |
|   | H |   |   | $T_v,0$ | H | H |   |   | $T_v,8$ |
|   | H |   | H | $T_v,1$ | H | H |   | H | $T_v,9$ |
|   | H | H |   | $T_v,2$ | H | H | H |   | $T_v,10$ |
|   | H | H | H | $T_v,3$ | H | H | H | H | $T_v,11$ |

In this table, for example, if D, C, B, A = 0, 0, 0, H, then the common collector terminal voltage $V_5$ corresponds to an apex value $T_v$ of minus 3. Similarly, if D, C, B, A = H, H, H, 0, the voltage $V_5$ will correspond to a $T_v$ of plus 10.

Figure 4:
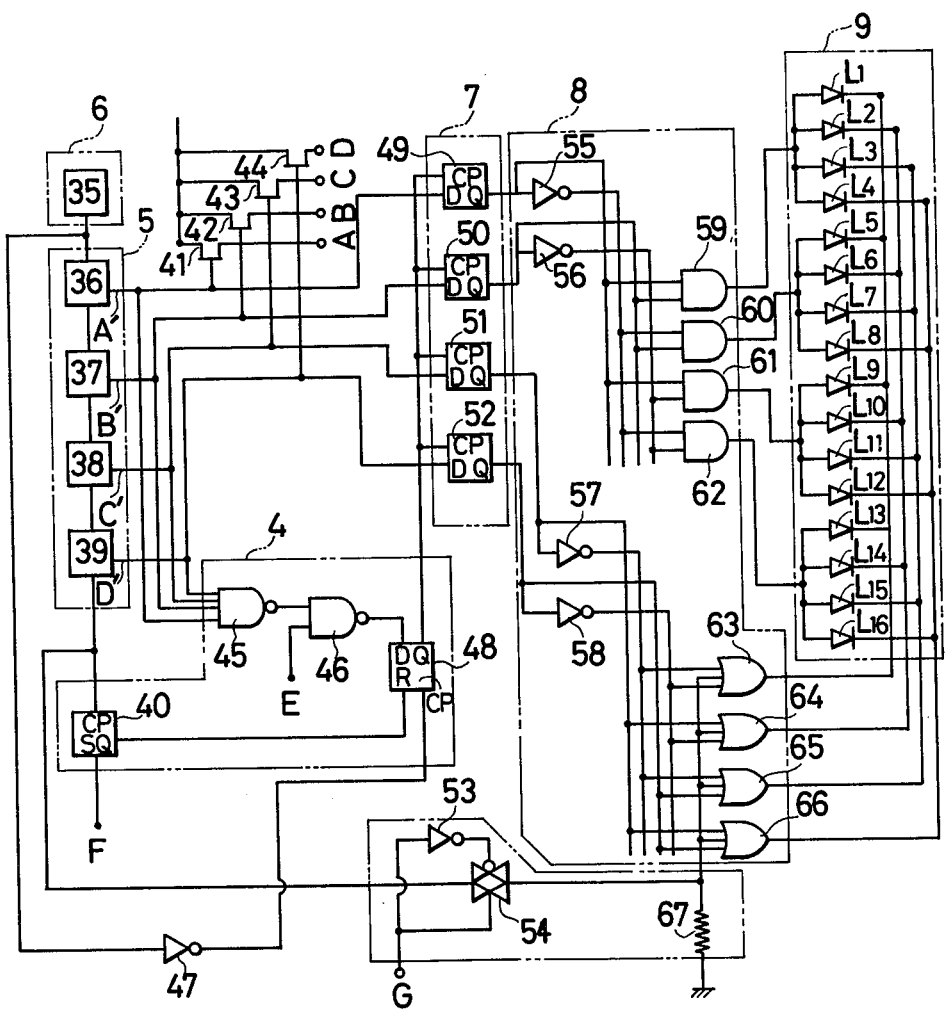
FIG. 4 shows a schematic circuit diagram of and the electrical connections between the logic circuit 4, counter 5, oscillator 6, latch 7, decoder 8 and LED array 9 shown in FIG. 1.

Referring now to FIG. 4, which shows a logic block diagram of and the electrical connections between the logic circuit 4, the counter 5, the oscillator 6, the latch circuit 7, the decoder circuit 8 and the LED array 9, an oscillator 35 is connected to flip-flops 36, 37, 38 and 39 which count the number of pulses produced by the oscillator, and to the set terminal of another flip-flop 40.

The output terminals of FF's 36, 37, 38 and 39 are connected to FETs 41, 42, 43 and 44, and NAND circuit 45, and D-type FF's 49, 50, 51 and 52, said FET outputs A, B, C and D being connected to the emitters of transistors 22, 24, 26 and 28 in FIG. 3. A D-type FF 48 has a terminal D to which is connected an output of a NAND circuit 46, to which in turn is connected the output of the NAND circuit 45, a terminal CP to which the output to the oscillator 35 is connected through a NOT circuit 47, and a terminal R to which is connected an output of FF 40. The output terminal Q of FF 48 is connected to the CP terminals of 49, 50, 51 and 52.

The NOT circuits 55-58, AND circuits 59-62, and OR circuits 63-66, in combination, constitute the binary-to-decimal decoder circuit 8 which drives the array 9 of LEDs $L_1$, $L_2$, $L_3$ ... $L_{16}$. Reference numeral 54 designates a transmission gate to which an output of FF 39 is coupled, and the output terminal of which is connected to an input terminal of each OR circuit 63-66. The other control terminal of the transmission gate is connected to a "battery weak" input terminal G through a NOT circuit 53.

In operation, FFs 36, 37, 38 and 39 start counting the pulses generated by the oscillator 35, and at the same time the voltage level in the output of the D/A convertor changes in accordance with the values given in Table 1 due to the outputs A, B, C, and D of the FETs 41, 42, 43, and 44. When the level of the D/A convertor output reaches the output voltage $V_3$ of the light measuring and computing circuit, then the output terminal E of the comparator 34 changes from "1" to "0." Since the output of NAND circuit 45 is "1" except when its inputs are 1, 1, 1, 1, a change from "1" to "0" at the output terminal of the comparator raises the output of NAND circuit 46, and thus the D input to FF 48, from "0" to "1." This reverses the Q output of FF 48, which is applied to the CP terminals of FFs 49, 50, 51 and 52 in synchronism with the raising of the output of NOT circuit 47, whereby the count value in FFs 36, 37, 38 and 39 is fed to and latched in FF's 49, 50, 51 and 52, respectively. The binary latch outputs are converted to decimal form by the decoder 8, whose outputs in turn drive the LED indicating array 9.

If the output $V_3$ of the light measuring and computing circuit 1 is higher than $T_{v11}$ (Table 1), the output of the comparator 34 remains "1." On the other hand, in response to a change in the output of the NAND circuit 45 from "1" to "0" the count values stored in 36, 37, 38, and 39 will be fed to FFs 49, 50, 51 and 52, respectively. Table 2 shows the relationship between the count values of the counter FF's 36, 37, 38 and 39 and the LEDs energized by such values.

Table 2

| D' | C' | B' | A' | LED | D' | C' | B' | A' | LED |
|---|---|---|---|---|---|---|---|---|---|
| 0 | 0 | 0 | 0 | $L_{16}$ | 1 | 0 | 0 | 0 | $L_8$ |
| 0 | 0 | 0 | 1 | $L_{15}$ | 1 | 0 | 0 | 1 | $L_7$ |
| 0 | 0 | 1 | 0 | $L_{14}$ | 1 | 0 | 1 | 0 | $L_6$ |
| 0 | 0 | 1 | 1 | $L_{13}$ | 1 | 0 | 1 | 1 | $L_5$ |
| 0 | 1 | 0 | 0 | $L_{12}$ | 1 | 1 | 0 | 0 | $L_4$ |
| 0 | 1 | 0 | 1 | $L_{11}$ | 1 | 1 | 0 | 1 | $L_3$ |
| 0 | 1 | 1 | 0 | $L_{10}$ | 1 | 1 | 1 | 0 | $L_2$ |
| 0 | 1 | 1 | 1 | $L_9$ | 1 | 1 | 1 | 1 | $L_1$ |

A', B', C' and D' in Table 2 correspond to A, B, C and D in Table 1, "0" in Table 2 corresponds to a blank in Table 1, and "1" in Table 2 corresponds to H in Table 1. When the outputs of the FF's 36-39 reach 1, 1, 1, 1, and the next pulse generated is fed to FF 36, the outputs of FF's 36-39 change to 0, 0, 0, 0, and simultaneously the output of FF 40 becomes "1." Consequently, the signal at the reset terminal R of FF 48 becomes "1" and the Q terminal output thereof becomes "0," independently of the output of the NAND circuit 46, whereby the values latched into FF's 49-52 remain intact.

On the other hand, if the output $V_3$ of the light measuring circuit 1 remains at a level lower than $T_v - 4$ (Table 1), the output of the comparator 34 remains "0". When the output of FF 40 changes from "1" to "0," and the next pulse from the NOT circuit 47 is fed to the FF 48, then the Q output of FF 48 changes from "1" to "0" and the counter values of the FF's 36-39 are fed to the FF's 49-52, respectively.

If the signal at terminal F applied to the set terminal S of FF 40 is "1," then the Q output of FF 40 will be "1" and the Q output of FF 48 will be "0," with the result that the latch FF's 49-52 store the values fed them immediately before the signal at the set terminal S changes to "1." Thus, if the set terminal of FF 40 is changed from "0" to "1" in synchronism with the rotation of a camera reflex mirror to its upper position, then any changes in the output from the light measuring and computing circuit 1 which result from the shifting of the mirror do not cause any fluctuations in the LED indication.

If the signal applied to the control terminal G of the transmission gate 54 is "0," then the gate 54 remains non-conducting and its output remains at "0." On the other hand, if the control terminal G changes from "0" to "1," then the gate 54 becomes conducting. As a result, the output pulses from FF 39 are fed to ground through the resistor 67, which causes the LEDs to flash or flicker. Accordingly, if a circuit whose output changes from "0" to "1" due to a voltage drop in the potential source is connected to the control terminal G of the gate 54, a low supply voltage from the potential source will be indicated by the flashing LEDs.

The features of the digital indicating circuit according to the present invention include the following:

(1) The counter 5 starts counting the number of pulses generated by the oscillator 6, and simultaneously with such counting there arises a corresponding change in the output level of the D/A converter 3. The prior art circuits, at this stage, have been characterized by ringing on the output side of the D/A converter, whereby when a comparison is made between the D/A converter and the light measuring and computing circuit outputs, an unstable indication resulted. In the digital indicating circuit according to the present invention, on the other hand, a comparison is made between the outputs of the D/A converter and the light measuring and computing circuit at an interval of a half pulse after a change in the output level of the D/A converter, thus allowing time for transients to settle out and resulting in a more stable circuit operation;

(2) A FF circuit 40 is disposed on the output side of the counter 5, so that the value obtained from the counter 5 may be stored in the latch circuit only when the output of the FF circuit is "0," thereby insuring an UNDER indication (when the output level is lower than $T_v-4$), with freedom of interference;

(3) Due to the various logic signals generated when the values obtained from the counter 5 reach 1, 1, 1, 1, while the output of the comparator remains unchanged, an OVER indication (when the output level is higher than $T_{v11}$) is effected;

(4) When the set terminal of an FF circuit 40 disposed on the output side of the counter 5 is changed from "0" to "1," the LEDs are maintained in their indicated condition. Should chattering arise at the CP terminal of the FF circuit, stable operation is not impaired; and (5) A transmission gate 54 is connected to the output side of the counter 5 to thereby feed a counter output to the decoder circuit 8 under the control of a "low battery" input applied to the control terminal of the transmission gate, whereby a plurality of LEDs flash to give warning that a power cell is running out.

It will be understood, of course, by those skilled in the art, that if the variable resistor 15 in FIG. 2 is set instead to be proportional to the difference between the film sensitivity apex value $S_v$ and a desired exposure time apex value $T_v$, then the system will calculate and digitally display the apex value of the aperture opening $A_v$ as a function of the measured brightness.

What is claimed is:

1. A digital indicating circuit for a camera, comprising:
   (a) an oscillator;
   (b) a digital counter for counting the number of pulses generated by said oscillator;
   (c) a latch circuit for storing, on command, the digital value obtained from said counter;
   (d) an array of visual indicating elements;
   (e) a decoder circuit for energizing an indicating element in accordance with the digital value stored in said latch circuit;
   (f) A D/A convertor for converting the digital value obtained from said counter into an analog value;
   (g) a light detector for producing an analog output signal proportional to an unknown photographic parameter as a function of preset photographic parameters and a detected brightness level;
   (h) a comparator for comparing the analog outputs of said D/A converter and said light detector; and
   (i) logic circuit means responsive to the comparator for commanding the latch circuit to store the value obtained from said counter at an interval of approximately a half cycle of a pulse generated in said oscillator after the output of said D/A converter reaches the amplitude level of the output signal from said light detector.

2. A digital indicating circuit for a camera as defined in claim 1, wherein a flip-flop circuit is connected to an output terminal of said counter, and the value obtained from said counter may be stored in the latch circuit only when the output of said flip-flop circuit is in a predetermined state.

3. A digital indicating circuit as defined in claim 2, wherein said flip-flop circuit has a set terminal, and wherein the counter value stored in the latch circuit is maintained intact in response to an input signal applied to said set terminal.

4. A digital indicating circuit for a camera as defined in claim 1, wherein the logic circuit means includes means for detecting when each bit of said counter is "1," and wherein, in response to such detection and the output of said comparator, the value obtained from said counter is stored in the latch circuit.

5. A digital indicating circuit for a camera as defined in claim 1, comprising a D-type flip-flop circuit clocked by a pulse train having a phase opposite to that of the pulse train of said oscillator, and wherein the output of said comparator is fed to an input terminal of said D-type flip-flop circuit.

6. A digital indicating circuit for a camera as defined in claim 1, wherein an output of said counter is fed to the decoder circuit by a transmission gate, and wherein a "low battery" warning signal is fed to a control terminal of said transmission gate, thereby causing the array of indicating elements to flicker when the battery runs low.

* * * * *